(12) United States Patent
Perry et al.

(10) Patent No.: US 8,241,542 B2
(45) Date of Patent: Aug. 14, 2012

(54) METHOD FOR PREPARING A COMPOSITE MATERIAL HAVING NANOFIBERS EXPOSED THEREFROM

(75) Inventors: Robert James Perry, Niskayuna, NY (US); Kasiraman Krishnan, Clifton Park, NY (US); Amitabh Bansal, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 777 days.

(21) Appl. No.: 12/246,040

(22) Filed: Oct. 6, 2008

(65) Prior Publication Data

US 2010/0086785 A1 Apr. 8, 2010

(51) Int. Cl.
*B28B 11/14* (2006.01)

(52) U.S. Cl. ............. 264/138; 264/271.1; 264/162; 264/157

(58) Field of Classification Search .......... 264/138, 264/139, 163, 162, 157, 158, 271.1
See application file for complete search history.

(56) References Cited

U.S. PATENT DOCUMENTS

| 7,169,250 | B2 | 1/2007 | Kim et al. |
| 2006/0073332 | A1* | 4/2006 | Huang et al. ............ 428/367 |
| 2006/0131265 | A1 | 6/2006 | Samper |
| 2006/0148978 | A1 | 7/2006 | Reneker |
| 2006/0264140 | A1 | 11/2006 | Andrady et al. |
| 2007/0190880 | A1 | 8/2007 | Dubrow et al. |
| 2007/0261959 | A1 | 11/2007 | Kim et al. |
| 2007/0269655 | A1 | 11/2007 | Joo et al. |

FOREIGN PATENT DOCUMENTS

| WO | WO2008076390 A2 | 6/2008 |
| WO | WO2008115640 A2 | 9/2008 |

OTHER PUBLICATIONS

Saeed et al., "Preparation of electrospun nanofibers of carbon nanotube/polycaprolactone nanocomposite" Sep. 27, 2006, Polymer 47 p. 8019-8025.*
Jung, Yung Joon et al., Aligned Carbon Nanotube-Polymer Hybrid Architectures for Diverse Flexible Electronic Applications, Nano Letters, Feb. 1, 2006, pp. 413-418, vol. 6, No. 3, American Chemical Society, published on Web Feb. 1, 2006.
Sitti, Metin et al., Synthetic gecko foot-hair micro/nano-structures as dry adhesives, J. Adhesion Sci. Technol., Mar. 7, 2003, pp. 1055-1073, vol. 17, No. 8, VSP, www.vsppub.com.
European Search Report dated Feb. 25, 2010; Reference MJN/69651/000.

* cited by examiner

*Primary Examiner* — Christina Johnson
*Assistant Examiner* — Galen Hauth
(74) *Attorney, Agent, or Firm* — Bracewell & Giuliani LLP

(57) ABSTRACT

A composite material having exposed nanofibers is prepared by dividing a polymer nanofiber matrix into sections. A portion of a polymeric substrate material is removed to expose lengths of nanofibers that together can act as a nanoadhesive.

21 Claims, 2 Drawing Sheets

METHOD FOR PREPARING A COMPOSITE MATERIAL HAVING NANOFIBERS EXPOSED THEREFROM

BACKGROUND OF THE INVENTION

1. Technical Field of the Invention

The present invention relates to a method of constructing a composite material capable of acting as a nanoadhesive. More specifically, the present invention relates to a method of constructing a composite material having nanofibers exposed therefrom, which provide the desired nanoadhesive properties.

2. Background of the Invention

Geckos possess a unique ability that allows them to climb vertical walls and horizontal surfaces, such as ceilings, with relative ease. Their feet, or toe pads, contain high aspect ratio beta-keratin structures that adhere to any surface with a pressure controlled contact area. As shown by Metin Sitti and Ronald S. Fearing (M. Sitti and R. Fearing, "Synthetic Gecko Foot-hair Micro/nano-structures as Dry Adhesives", J. Adhesion Sci. Technol., Vol. 17, No. 8, pp. 1055-1073 (2003)), each foot of a gecko contains millions of these high aspect ratio structures called spatula stalks, which in turn have spatulae at their ends. These spatulae, in combination with each other, provide the necessary force to support the gecko as it traverses walls, ceilings and other objects. What is more impressive though is that these same spatulae allow for a quick release, allowing the gecko to move so quickly and fluidly across walls and ceilings. The spatula stalks are approximately 100-200 nm in diameter, with the spatulae having approximately 300-500 nm width at their ends. Sitti and Fearing focused their research on producing these hair-like structures using nano imprinting. In this method, they started out with a wax and poked it with a probe to produce an indented surface. A polymer was then used to create a mold of the indentions, and then the polymer and wax were separated from each other, leaving a polymer mold having high aspect ratio protrusions. However, this method does not allow for the growing of nanofibers on a flexible substrate. Furthermore, nano imprinting has problems related to overlay, defects, template patterning and template wear. Additionally, there are proximity effects associated with imprinting that cause the outer layers of the imprint to fill more quickly than the middle sections leaving an uneven imprint.

Therefore, it would be beneficial to have a method of producing a composite material that could act as a nanoadhesive and was able to be constructed on a flexible substrate, and using a variety of starting materials.

SUMMARY OF THE INVENTION

The present invention is directed to a method that satisfies at least one of these needs One embodiment of the present invention provides for a method for preparing a composite material having nanofibers exposed therefrom. This embodiment includes providing a polymer nanofiber matrix that has a length, width and thickness. The polymer nanofiber matrix includes a polymeric substrate material and embedded nano fibers. The polymer nanofiber matrix is partitioned into sections along an axis that is substantially transverse to the length of the polymer nanofiber matrix. Subsequently, a portion of the polymeric substrate material is removed in order for a portion of the nanofibers to extend from the polymer nanofiber matrix; forming a set of fibrils. In one embodiment, the portion is removed by etching. However, those of ordinary skill in the art will recognize other ways to selectively remove the polymeric substrate material faster than the embedded nanofibers. Dissolving techniques are included in acceptable techniques to selectively remove the polymeric substrate material.

In another embodiment of the present invention, a polymer nanofiber matrix is provided that has embedded nanofibers arranged in layers. A layer of the polymer nanofiber matrix is removed to create embedded nanofiber ends such that the embedded nanofiber ends are exposed on the surface of the polymer nanofiber matrix. At least a portion of the polymeric substrate material is removed from the surface of the polymer nanofiber matrix such that a portion of the embedded nanofibers extends from the remaining surface of the polymer nanofiber matrix, forming a set of fibrils. In an additional embodiment, the step of removing a layer of the polymer nanofiber matrix is accomplished by slicing, cutting, sanding, shaving, dividing the polymer nanofiber matrix into sections, or any equivalent thereof. In one embodiment, the embedded nanofibers are substantially parallel. In another embodiment, the orientation of the embedded nanofibers of a first layer of embedded nanofibers is substantially parallel, but the orientations of adjacent layers of embedded nanofibers are not parallel with respect to the first layer of embedded nanofibers. In another embodiment, the embedded nanofibers are completely randomized.

BRIEF DESCRIPTION OF THE DRAWINGS

So that the manner in which the above-recited features, advantages, and objectives of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only several embodiments of the invention and are, therefore, not to be considered limiting of the invention's scope, for the invention may admit to other equally effective embodiments.

DETAILED DESCRIPTION

Figure 2:
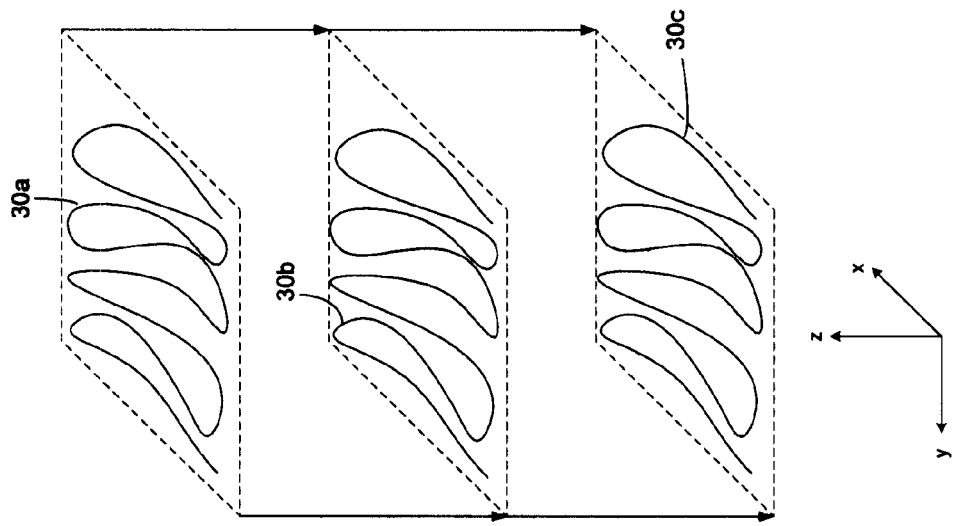
FIG. 2 is an isometric illustration of stacking the nanofiber layers.

The present invention provides a method for preparing a composite material having nanofibers exposed therefrom. In an embodiment of the present invention, the user provides a polymer nanofiber matrix having a length, width, and a thickness, with the polymer nanofiber matrix comprising a polymeric substrate material and embedded nanofibers. The polymer nanofiber matrix is comprised of a polymeric substrate material and embedded nanofibers. In one embodiment of the present invention, this polymer nanofiber matrix can be formed by stacking nanofiber layers that were formed by electrospinning. In one embodiment, the nanofiber layers are embedded with the polymeric substrate material by stacking nanofiber layers and infiltrating the layers with a curable resin. However, other methods of embedding the nanofibers within the polymeric substrate material include crosslinking or polymerizing. Acceptable thermoplastics include Poly(methyl methacrylate), Polystyrene, Nylons, Polyesters, Polyimides, Polycarbonates, Polysulfones, and Polyolefins. These thermoplastics can be polymerized in place or preformed and melted, then flowed into place. Acceptable thermosets include epoxy, siloxanes, imides, and amides. These thermosets start out with a low viscosity, and following infiltration into the nano fiber layers, the thermosets are crosslinked into place. In one embodiment, the polymer nanofiber matrix is then partitioned into sections along an axis that is substantially transverse to the length of the polymer nanofiber matrix. A portion of the polymeric substrate material is then removed from the partitioned section, such that a portion of the embedded nanofibers extends from the partitioned section, forming a set of fibrils. This removal step can be accomplished by etching, dissolving or combinations thereof. In embodiments using an etching process, a gas, gas plasma, ion beam, or liquid (such as solvents, acids, or bases) can be used. In these embodiments, acceptable gases include oxygen, argon, helium, halocarbons (e.g. $CF_4$, $CF_3Br$, $CF_2Cl_2$), HCl, $Cl_2$, $SF_6$; acceptable plasmas include oxygen, argon, helium and mixtures of gas listed above; and acceptable liquids include acid solutions (HF for siloxanes), base solutions (e.g. NaOH/KOH for siloxanes), solvents for the matrix (such as $CH_2Cl_2$ for Polycarbonates and methacrylates, and Benzene for polystyrene (PS) Other gases, plasmas and liquids can be employed depending on the user's selection of nanofibers and polymeric substrate material.

In an embodiment of the present invention, the set of fibrils are operable to create a nano-adhesive. In other embodiments, the polymeric substrate material can be Nylons, Polyesters, PBT's (polybenzothiazoles), PDMS (polydimethysiloxanes), PEEK (polyetheretherketones), PEK (polyetherketones) Polyimides, Polysulfones, Aramids, Polyamides, Cellulosic polymers, Polysaccharides, Polyethylene, Polypropylene, Polyolefins, Polycarbonates and combinations thereof. In another embodiment, the polymeric substrate material is a flexible material; for example PDMS, Cellulosic, Rubber, or Elastomers. In other embodiments of the present invention, the nanofibers are cellulosic nanofibers, carbon nanotubes, or electrospun polymers.

In one embodiment of the present invention, the nanofibers are aligned in a substantially parallel orientation. However, other embodiments can include a first layer of embedded nanofibers that are substantially parallel, and wherein the orientations of adjacent layers of embedded nanofibers are not parallel with respect to the first layer of embedded nanofibers. In one embodiment of the present invention, the sections of the polymer nanofiber matrix have a thickness in the range of 50 to 200 microns.

In another embodiment of the present invention, a method for preparing a composite material having exposed nano fibers extending from at least one surface includes providing a polymer nanofiber matrix, wherein the polymer nanofiber matrix comprises embedded nanofibers arranged in layers. A layer of the polymer nanofiber Matrix is removed to create embedded nanofiber ends, such that the embedded nanofiber ends are exposed on the surface of the polymer nano fiber matrix. At least a portion of the polymeric substrate material is then removed from the surface of the polymer nanofiber matrix, such that a portion of the embedded nanofibers extends from the remaining surface of the polymer nanofiber matrix, forming a set of fibrils.

In other embodiments of the present invention, the step of removing a layer of the polymer nanofiber matrix can be accomplished by slicing, cutting, sanding, shaving, or combinations thereof In another embodiment of the present invention, this step can also be accomplished by dividing the polymer nanofiber matrix into sections.

In another embodiment of the present invention a composite material comprises a substrate and nanofibers. A portion of the nanofibers are embedded within the substrate and a portion of the nanofibers extend from an external surface of the substrate such that the composite material is operable to create a nanoadhesive. In a further embodiment, the substrate and nanofibers are created using differing material.

Figure 1:
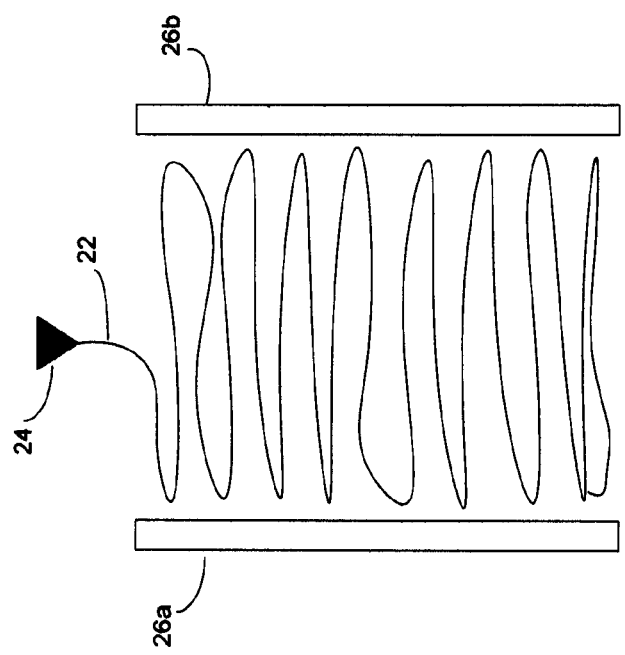
FIG. 1 is an illustration displaying an embodiment of the present invention.

In FIG. 1, polymer fiber [22] is spun from nozzle [24] by introducing polymer fiber [22] into an electric field produced by oppositely charged electrodes [26a, 26b]. Other embodiments for creating the nanofiber layers include carbon nanotubes and cellulosic nanofibers. In other embodiments, the polymer fibers are preferably made of Nylons, Polyesters, PBT, PBI (polybenzimidazoles), PEEK, PEK, Polyimides, Polysulfones, Aramids, Polyamides, Cellulosic polymers, Polysaccharides, Polyethylene, Polypropylene, Polyolefins, Polycarbonates. In another embodiment, polymer fiber [22] is spun onto a conductive material (not shown) such as aluminum, copper, steel, iron or other conductive metals. For some applications, the nanofiber layers may need drying prior to stacking.

FIG. 2 represents an embodiment in which a plurality of nanofiber layers [30a, 30b, 30c] are stacked on each other relative to the z-axis to a desired thickness. In one embodiment, the thickness is between 1 and 10 mm. While FIG. 2 shows three layers being stacked, it should be readily apparent to one skilled in the art that any number of layers can be stacked to create the desired thickness.

Figure 4:
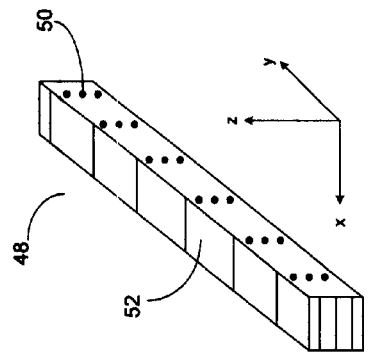
FIG. 4 is an isometric representation of a divided section of the polymer nanofiber matrix.

After stacking the nanofiber layers, a polymeric substrate material [52] in FIG. 4 is introduced into the stacked nanofiber layers [30] forming a polymer nanofiber matrix. The polymeric substrate material can be any resin that does not significantly alter the nanofiber material and is more susceptible to being removed than the nanofiber material. In one embodiment, the polymeric substrate material [52] is PDMS. In one embodiment of the present invention, the polymeric substrate material [52] is introduced into the stacked nanofiber layers by pouring; however, one skilled in the art can appreciate the many ways to perform this step.

The polymer nanofiber matrix is then cured. Curing can be accomplished using heat; however, any acceptable method of curing known in the art can be used. In one embodiment, the material is cured using an oven for approximately one (1) to thirty (30) minutes at 40 to 150° C. Curing can also be accomplished via chemical means, for example crosslinking with multifunctional groups via condensation or addition catalyzed by heat, light, or chemical catalysis.

Figure 3:
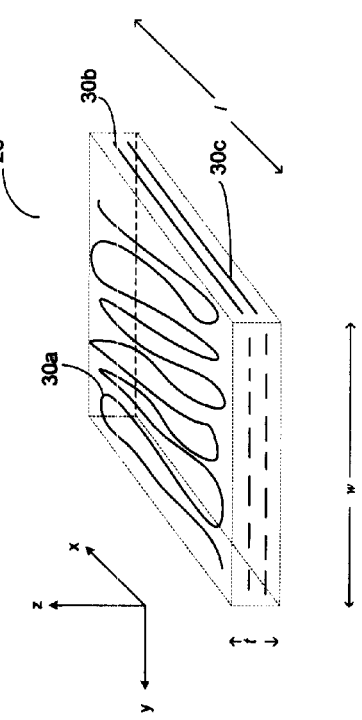
FIG. 3 is an isometric illustration showing the polymer nanofiber matrix having a desired thickness.

FIG. 3 is a depiction of the polymer nanofiber matrix [28] having a thickness [t], a width [w], and a length [l]. In the embodiment shown, polymer nanofiber matrix [28] has a first embedded nanofiber layer [30a], a second embedded nanofiber layer [30b], and a third embedded nanofiber layer [30c]. For purposes of this patent, when discussing the orientation of the embedded nanofibers, it should be understood that the embedded nanofibers are substantially oriented lengthwise along the length [l] of polymer nanofiber matrix [28]. However, in other embodiments of the present invention, the embedded nanofibers can be oriented in a variety of ways. For example they can be randomized or crosshatched. While polymer nanofiber matrix [28] is shown as a rectangular prism in FIG. 3, those of ordinary skill in the art should recognize that the present invention is not so limited. Polymer nanofiber matrix [28] can be any three dimensional amorphous structure.

FIG. 4 represents partitioned section [48] of the polymer nanofiber matrix following the step of partitioning the polymer nanofiber matrix into sections. In one embodiment of the present invention, the polymer nanofiber matrix is partitioned (multiple sections not shown) by cutting polymer nanofiber matrix [28] transverse to the orientation of the embedded nanofibers. As shown in FIG. 3, a majority of embedded nanofiber layers [30a, 30b, 30c] have a longitudinal axis substantially parallel with the x-axis. Therefore, in the embodiment shown in FIG. 4, partitioned section [48] was created by partitioning polymer nanofiber matrix [28] along the y-axis. Partitioned section [48] comprises polymeric substrate material [52] and embedded nanofiber ends [50].

Figure 5:
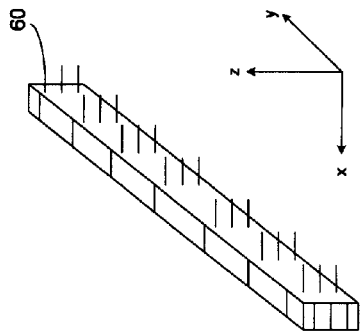
FIG. 5 is an isometric representation of the fibrils extending from the surface of the polymer nanofiber matrix.

FIG. 5 represents the result of removing a portion of polymeric substrate material [52] from partitioned section [48]. Following the partition step, a portion of polymeric substrate material [52] is removed from partitioned section [48], such that a portion of the embedded nanofibers extends from partitioned section [48] to form a set of fibrils [60]. In one embodiment, fibrils [60] are preferred to be about 5 to 10 nm in length; however, depending on the compliancy of fibrils [60], the length of fibrils [60] can be more or less. In the embodiment shown in FIG. 5, fibrils [60] were created by removing a portion of partitioned section [48] in the y-z plane. In one embodiment, polymeric substrate material [52] is removed by etching. It is well within the knowledge of one skilled in the art as to what the appropriate etching gas or plasma to use depending on what materials are used to create polymeric substrate material [52] and polymer fiber [22]. The only requirement related to the removal step is for polymeric substrate material [52] to be removed at a faster rate than embedded nanofiber ends [50].

Figure 6:
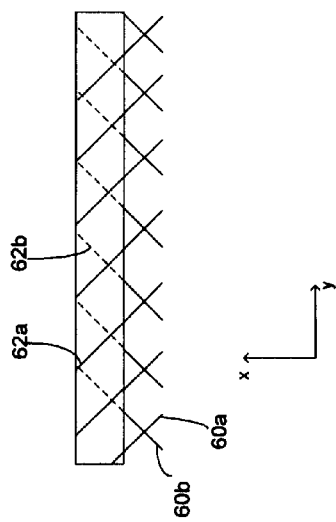
FIG. 6 is a top view representation of one embodiment of the present invention.

As noted earlier, in other embodiments of the present invention the orientation of the embedded nanofiber layers can be other than substantially parallel. FIG. 6 represents one such embodiment. FIG. 6 is a top view illustrating an alternate embodiment wherein the orientation of nanofibers [62a] within a first nanofiber layer are substantially parallel to each other; however, nano fibers [62a] within the first nanofiber layer are not parallel with respect to nanofibers [62b] within a second nanofiber layer. This embodiment results in fibrils [60a, 60b] being at orientations other than parallel to each other, or crosshatched.

The composite material created by the methods described herein can have many uses. For instance, it could be used as adhesives for robotic feet for climbing on walls and ceilings, all of which could be used in the fields of military, police, and scientific discovery. Moreover, the present invention could also allow for replaceable/repositionable wall coverings, field repair of holes or damaged surfaces/structures, repositionable electronic circuit elements, as well as non-solder contacts for adhesion.

As will be readily apparent to those skilled in the art, the present invention may easily be produced in other specific forms without departing from its spirit or essential characteristics. The presented embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A method for preparing a composite material having nanofibers exposed therefrom, the method comprising:
electrospinning a continuous nanofiber and depositing the continuous nanofiber in a zigzag pattern on a substrate, creating multiple layers stacked on each other, each of the layers having loops of the continuous nanofiber on first and second ends of each of the layers;
embedding the layers in a polymeric material, creating a block containing a stack of the layers;
cutting the block perpendicular to the layers to sever the loops on the first ends of the layers from the layers, creating a first surface of the block with severed ends of the nanofiber flush with the first surface of the block; and
removing a portion of the polymeric material from the first surface of the block, such that the severed ends protrude from the first surface, forming a set of fibrils.

2. The method of claim 1, wherein the fibrils are operable to create a nano-adhesive.

3. The method of claim 1, wherein electrospinning a continuous nanofiber comprises discharging a polymer material through a nozzle into an electric field.

4. The method of claim 1, wherein the nanofibers are aligned in a substantially parallel orientation.

5. The method of claim 1, wherein the embedded nanofibers of a first layer of embedded nanofibers are substantially parallel, and wherein the orientations of adjacent layers of embedded nanofibers are not parallel with respect to the first layer of embedded nanofibers.

6. The method of claim 1, wherein the sections of the polymer nanofiber matrix have a thickness in the range of 50 to 200 microns.

7. The method of claim 1, wherein the polymeric material is selected from the group consisting of Nylons, Polyesters, PBT, PBI, PDMS, PEEK, PEK, Polyimides, Polysulfones, Aramids, Polyamides, Cellulosic polymers, Polysaccarides, Polyethylene, Polypropylene, Polyolefins, Polycarbonates, PDMS, Cellulosic, Rubber, Elastomers, Epoxy, and combinations thereof.

8. The method of claim 1, wherein the nanofibers are electrospun from a polymer, and the polymer is selected from the group consisting of Polyesters, PBT's, PBI, PDMS, PEEK, PEK, Polyimides, Polysulfones, Aramids, Polyamides, Cellulosic polymers, Polysaccarides, Polyethylene, Polypropylene, Polyolefins, Polycarbonates, PDMS, Cellulosic, Rubber, Elastomers, and combinations thereof.

9. The method of claim 1, wherein the step of removing a portion of the polymeric material from the first surface is conducted by etching, dissolving, or combinations thereof.

10. A method for preparing a composite material, the method comprising:
providing a polymer nanofiber matrix block, wherein the polymer nanofiber matrix block comprises embedded nanofibers arranged in layers within a polymeric substrate material, the layers being stacked on top of each other, each of layers having a single continuous nanofiber arranged in a zig zag pattern with elongated side-by-side intermediate segments joined by loops at first and second ends of the layers;
removing a section of the polymer nanofiber matrix block perpendicular to the layers and transverse to the intermediate segments to remove the loops on the first ends of the layers from the intermediate segments, creating embedded nanofiber ends, such that the embedded nanofiber ends are exposed on a first surface of the polymer nanofiber matrix block; and
removing at least a portion of the polymeric substrate material from the first surface of the polymer nanofiber matrix block, such that a portion of the embedded nanofibers extends from the remaining first surface of the polymer nanofiber matrix block, forming a set of fibrils.

11. The method of claim 10, wherein the step of removing a section of the polymer nanofiber matrix is accomplished by slicing, cutting, sanding, shaving, or combinations thereof.

12. The method of claim 10, wherein prior to removing a section of the block, the nanofiber within each of the layers extends continuously through a plurality of the layers.

13. The method of claim 10 wherein the fibrils are operable to create a nano-adhesive.

14. The method of claim 10, wherein the embedded nanofibers are cellulosic nanofibers, or electrospun polymers.

15. The method of claim 10, wherein the intermediate segments of the embedded nanofibers within each of the layers are aligned in a substantially parallel orientation in a single planes, and the planes of the layers are parallel to each other.

16. The method of claim 10, wherein the intermediate segments of the embedded nanofibers of a first layer of embedded nanofibers are substantially parallel, and wherein the orientations of intermediate segments of the adjacent layers of embedded nanofibers are not parallel with respect to the intermediate segments of the first layer of embedded nanofibers.

17. The method of claim 10, wherein the step of removing a section of the polymer nanofiber matrix is conducted by etching, dissolving, or combinations thereof.

18. A method of forming a composite article, comprising:
(a) depositing a single continuous polymer nanofiber onto a substrate in a zigzag pattern, creating a base layer having a plurality of side-by-side elongated segments of the nanofiber, the segments joined to adjacent ones of the segments by loops at first and second ends of the base layer, the segments of the base layer having axes that are substantially located in a single plane;
(b) repeating step (a) a selected number of times to form additional layers on top of the base layer, creating a stack of the layers;
(c) embedding the stack of the layers in a resin and curing the resin to create a block;
(d) cutting the block perpendicular to the layers and transverse to the segments to sever the loops on the first ends of the layers from the segments, creating a flat side of the block with severed nanofiber ends flush with the flat side; then
(c) removing a portion of the resin on the flat side, such that the severed nanofiber ends protrude from the flat side.

19. The method according to claim 18, wherein step (a) comprises dispensing a polymer from a nozzle into an electric field located between two electrodes.

20. The method according to claim 19, wherein step (a) further comprises causing relative movement between the substrate and the nozzle.

21. The method according to claim 18, wherein step (b) comprises forming the additional layers of the stack with the same single continuous nanofiber that makes up the base layer.

* * * * *